(12) United States Patent
Jung

(10) Patent No.: US 11,196,897 B2
(45) Date of Patent: Dec. 7, 2021

(54) DISTRIBUTING AND MANAGING COLOR PROFILE

(71) Applicant: Hewlett-Packard Development Company, L.P., Spring, TX (US)

(72) Inventor: Joo Young Jung, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/976,896

(22) PCT Filed: Jul. 2, 2018

(86) PCT No.: PCT/KR2018/007469
§ 371 (c)(1),
(2) Date: Aug. 31, 2020

(87) PCT Pub. No.: WO2019/182201
PCT Pub. Date: Sep. 26, 2019

(65) Prior Publication Data
US 2021/0044723 A1 Feb. 11, 2021

(30) Foreign Application Priority Data
Mar. 23, 2018 (KR) .................. 10-2018-0034147

(51) Int. Cl.
*H04N 1/60* (2006.01)
*H04N 1/00* (2006.01)

(52) U.S. Cl.
CPC ......... *H04N 1/603* (2013.01); *H04N 1/00411* (2013.01); *H04N 1/6002* (2013.01); *H04N 2201/0094* (2013.01)

(58) Field of Classification Search
CPC .. H04N 1/603; H04N 1/00411; H04N 1/6002; H04N 2201/0094; H04N 1/0035
USPC ....................................................... 358/1.9
See application file for complete search history.

(56) References Cited

U.S. PATENT DOCUMENTS

| 8,018,620 | B2 | 9/2011 | Jung |
| 8,422,077 | B2 | 4/2013 | Jung |
| 9,094,642 | B2* | 7/2015 | Hashizume .......... H04N 1/4078 |
| 2002/0126301 | A1 | 9/2002 | Bowers |
| 2004/0130739 | A1 | 7/2004 | Adam et al. |
| 2004/0239935 | A1 | 12/2004 | Kitazawa |

(Continued)

FOREIGN PATENT DOCUMENTS

| CN | 1992779 A | 7/2007 |
| JP | 2003-110857 A | 4/2003 |
| JP | 2016-139223 A | 8/2016 |

(Continued)

OTHER PUBLICATIONS

Iwamoto, JP 2016/139223; Printing System and Printing Method, Published Aug. 4, 2016, Seiko Epson, Cited portions of English Translation (Year: 2016).*

*Primary Examiner* — Neil R McLean
(74) *Attorney, Agent, or Firm* — Jefferson IP Law, LLP

(57) ABSTRACT

An image forming apparatus determines whether a first image forming apparatus and the image forming apparatus are a same model, based on a first color profile used to determine a color output via a first image forming operation, and generates a second color profile that the image forming apparatus uses to output the same or a similar color to the color output via the first image forming operation.

19 Claims, 12 Drawing Sheets

(56) References Cited

U.S. PATENT DOCUMENTS

2014/0168674 A1* 6/2014 Shin .................. H04N 1/00278
358/1.9
2015/0124021 A1   5/2015 Yamashita

FOREIGN PATENT DOCUMENTS

| KR | 10-0728024 B1 | 6/2007 |
| KR | 10-2010-0084062 A | 7/2010 |
| KR | 10-2012-0140177 A | 12/2012 |
| KR | 10-2014-0076900 A | 6/2014 |

\* cited by examiner

[Fig. 1]
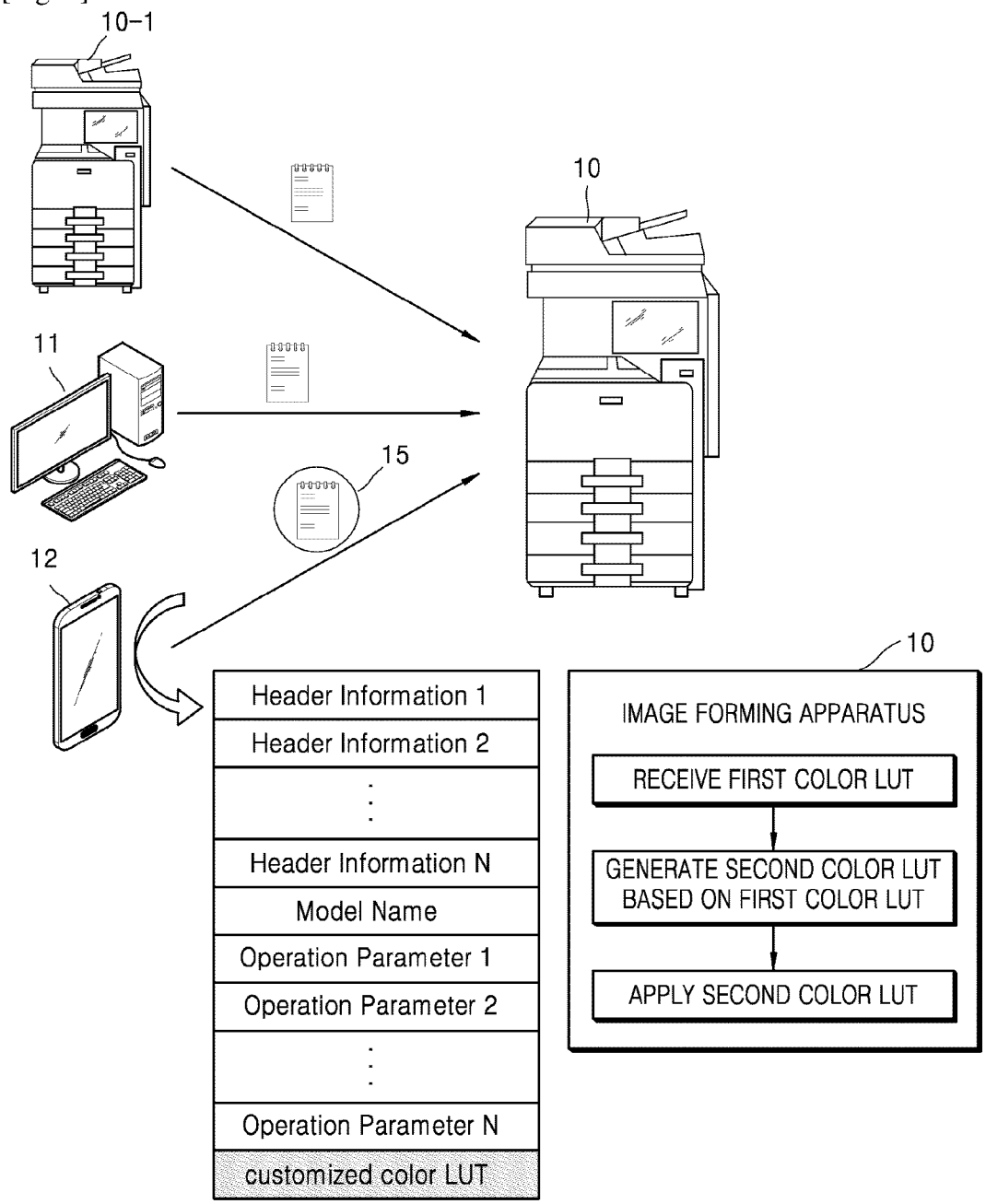

[Fig. 2]
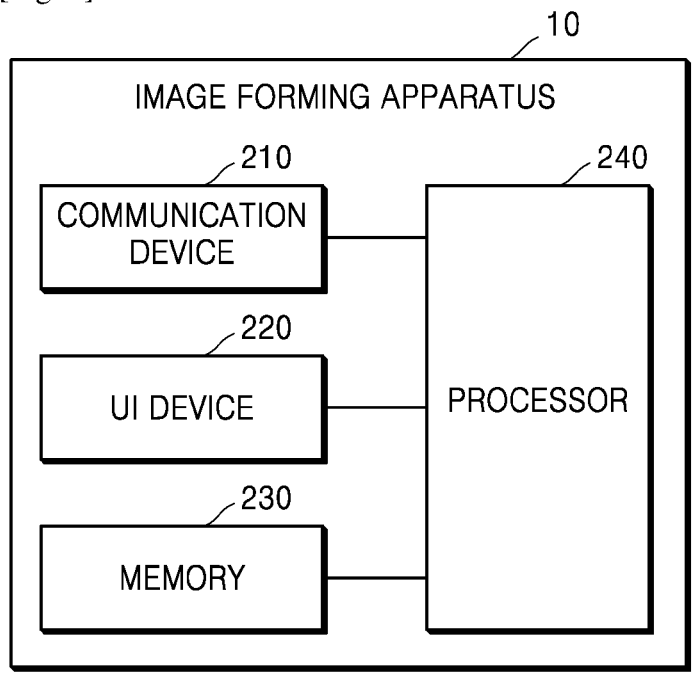
[Fig. 3]
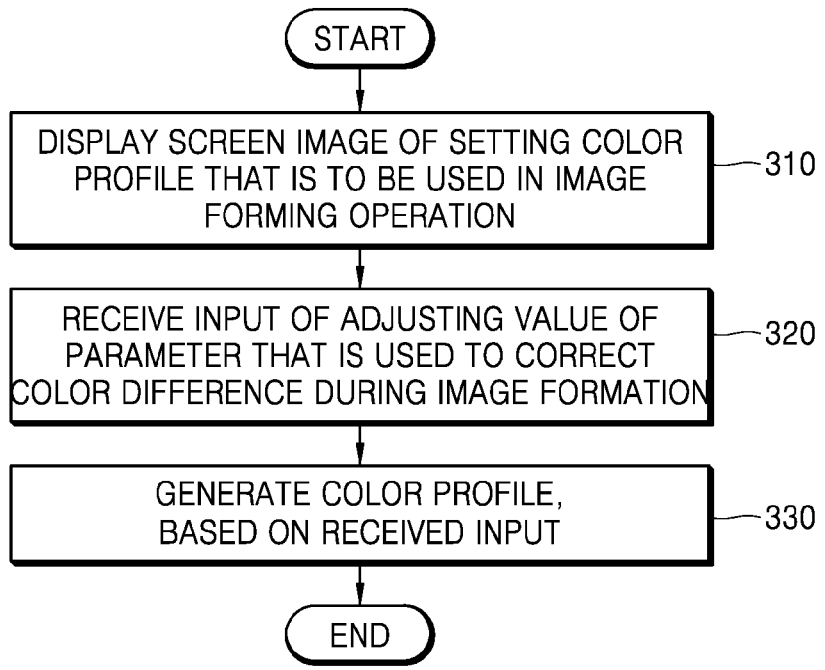

[Fig. 4]
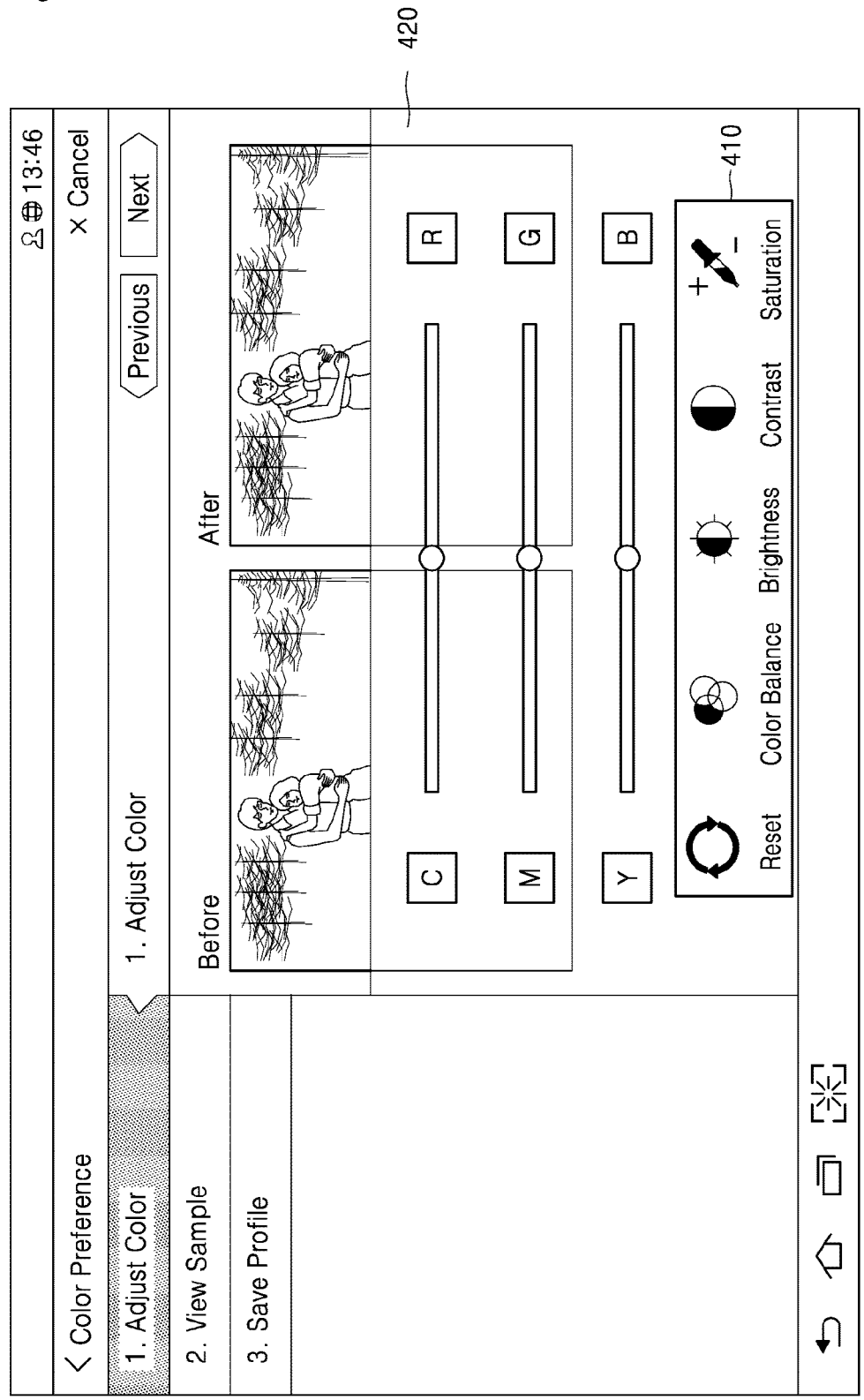

[Fig. 5]
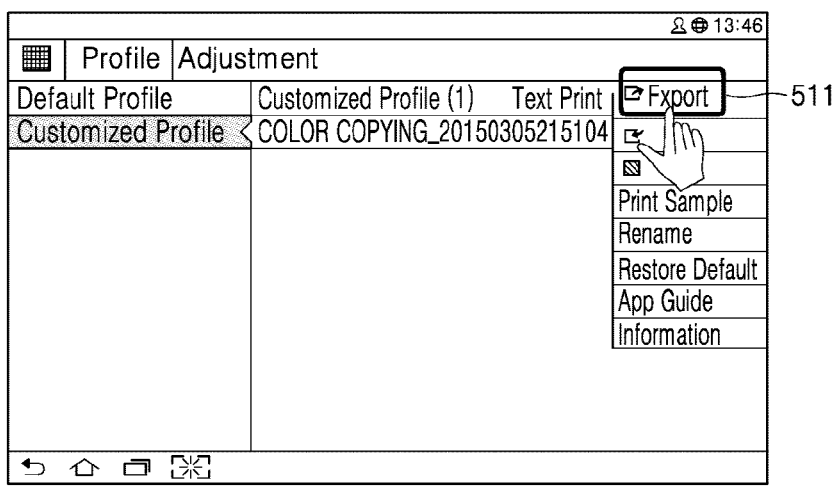

[Fig. 6]
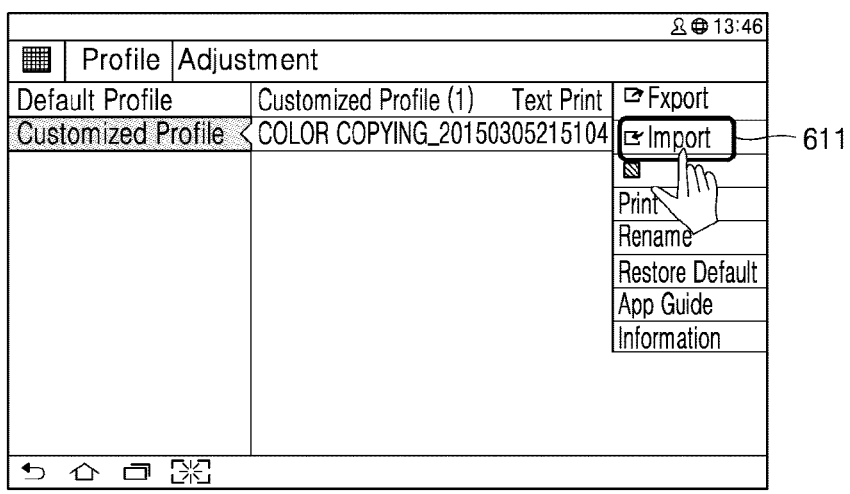

[Fig. 7]
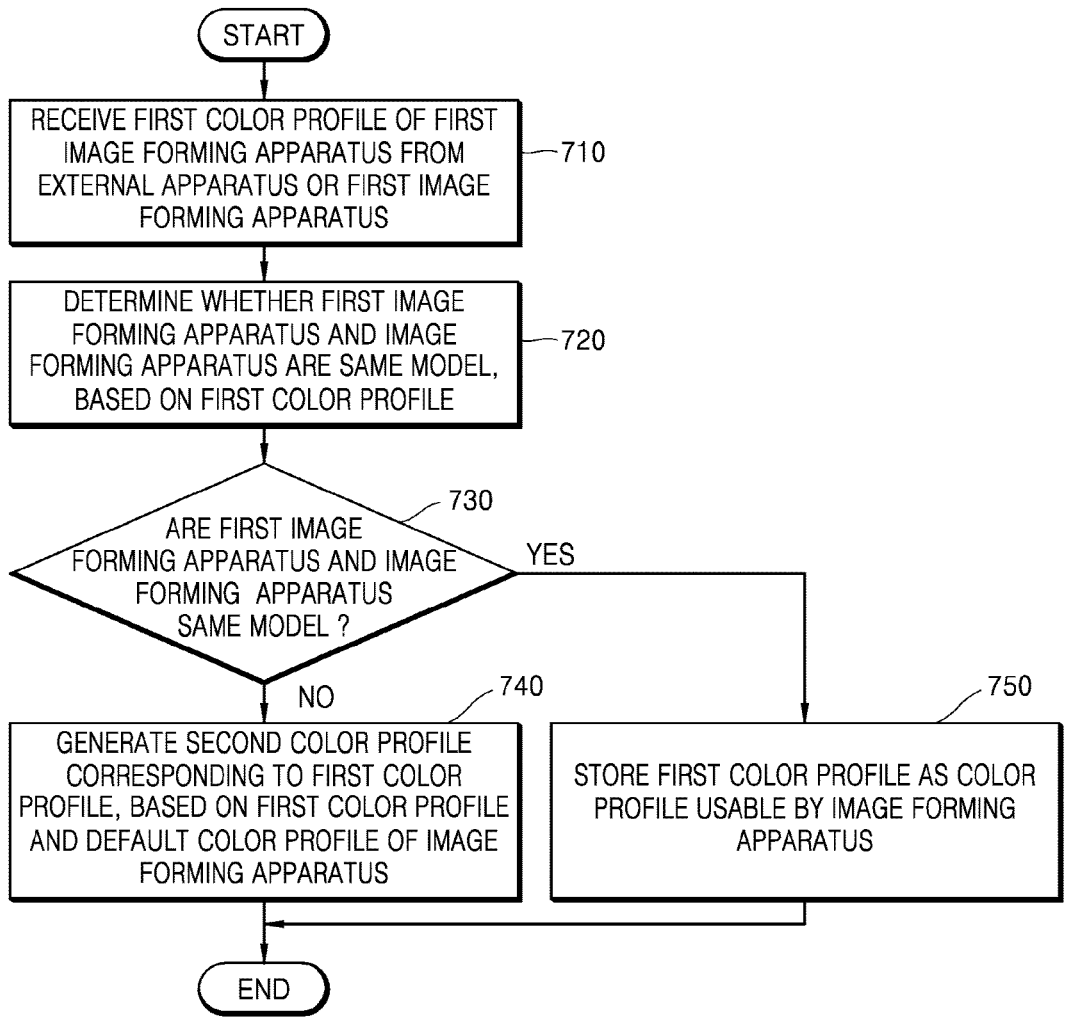

[Fig. 8]
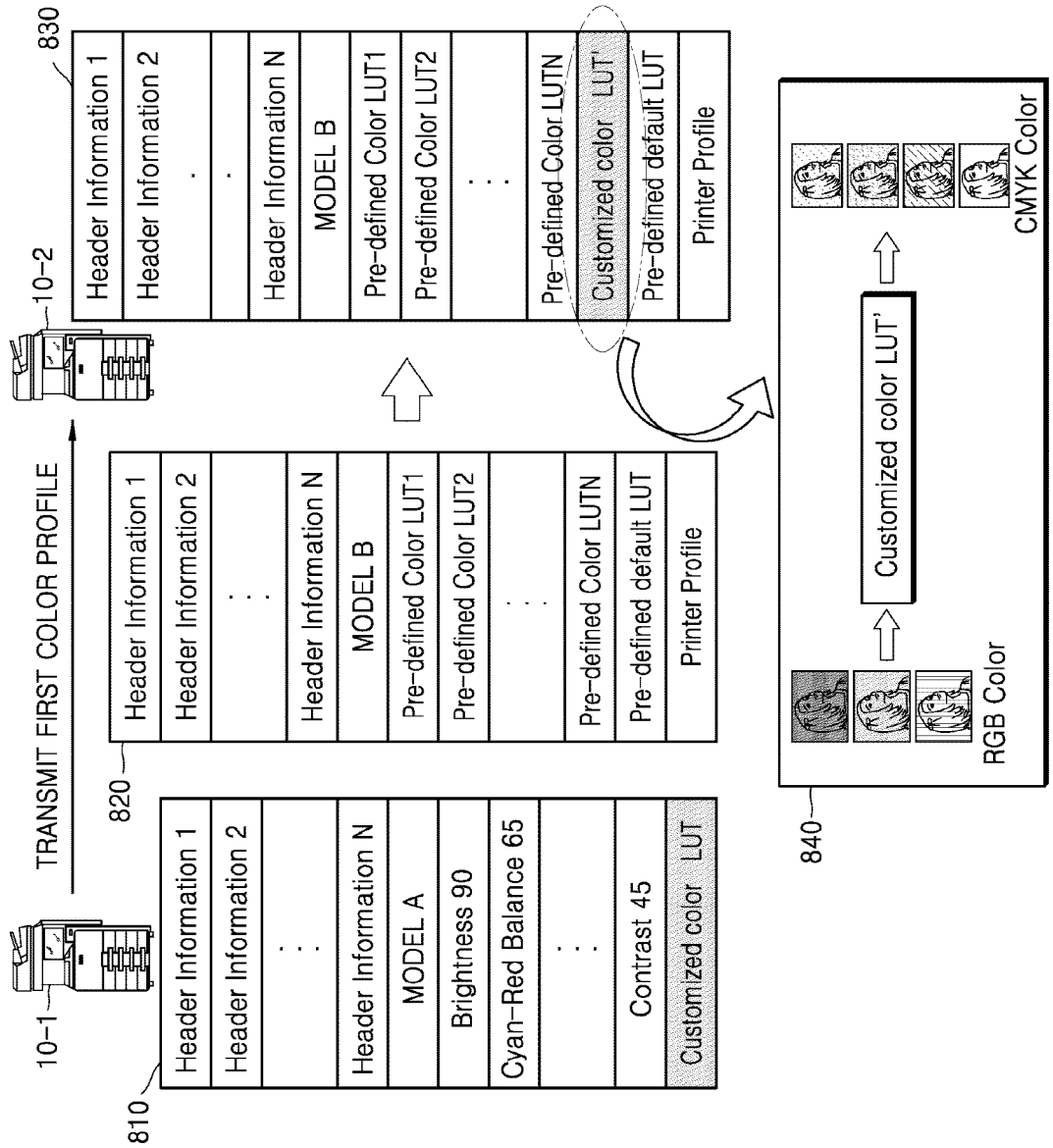

[Fig. 9A]
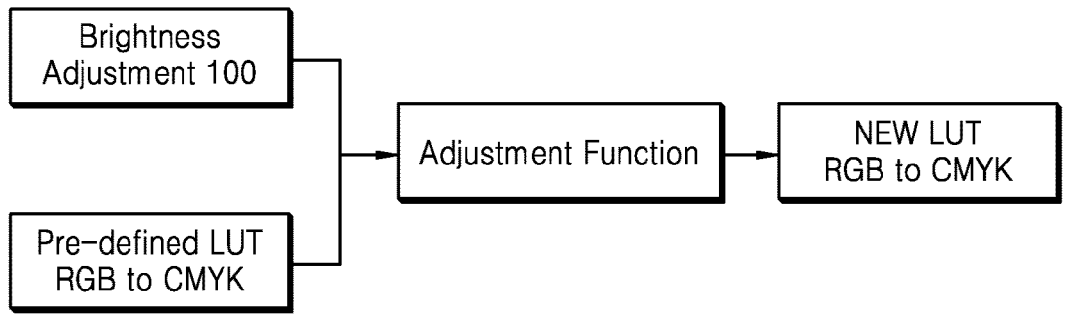
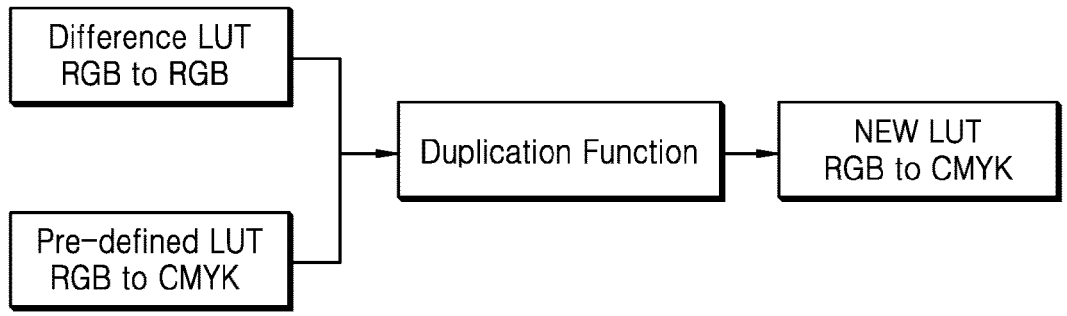
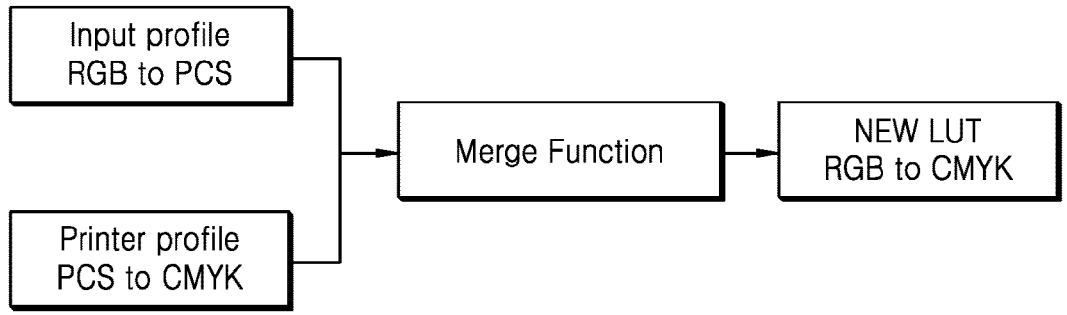

[Fig. 9B]
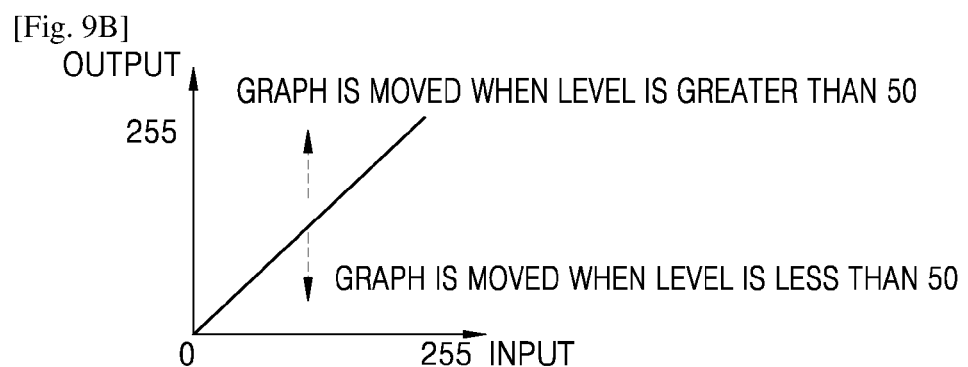
911
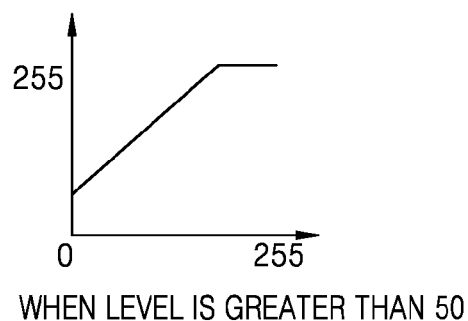
WHEN LEVEL IS GREATER THAN 50
912
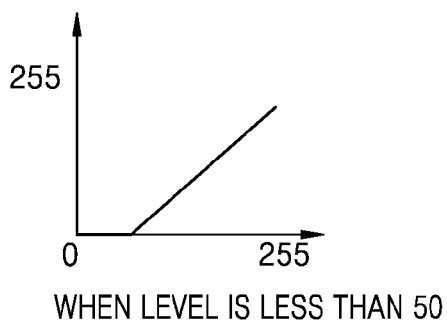
WHEN LEVEL IS LESS THAN 50
913

[Fig. 9C]
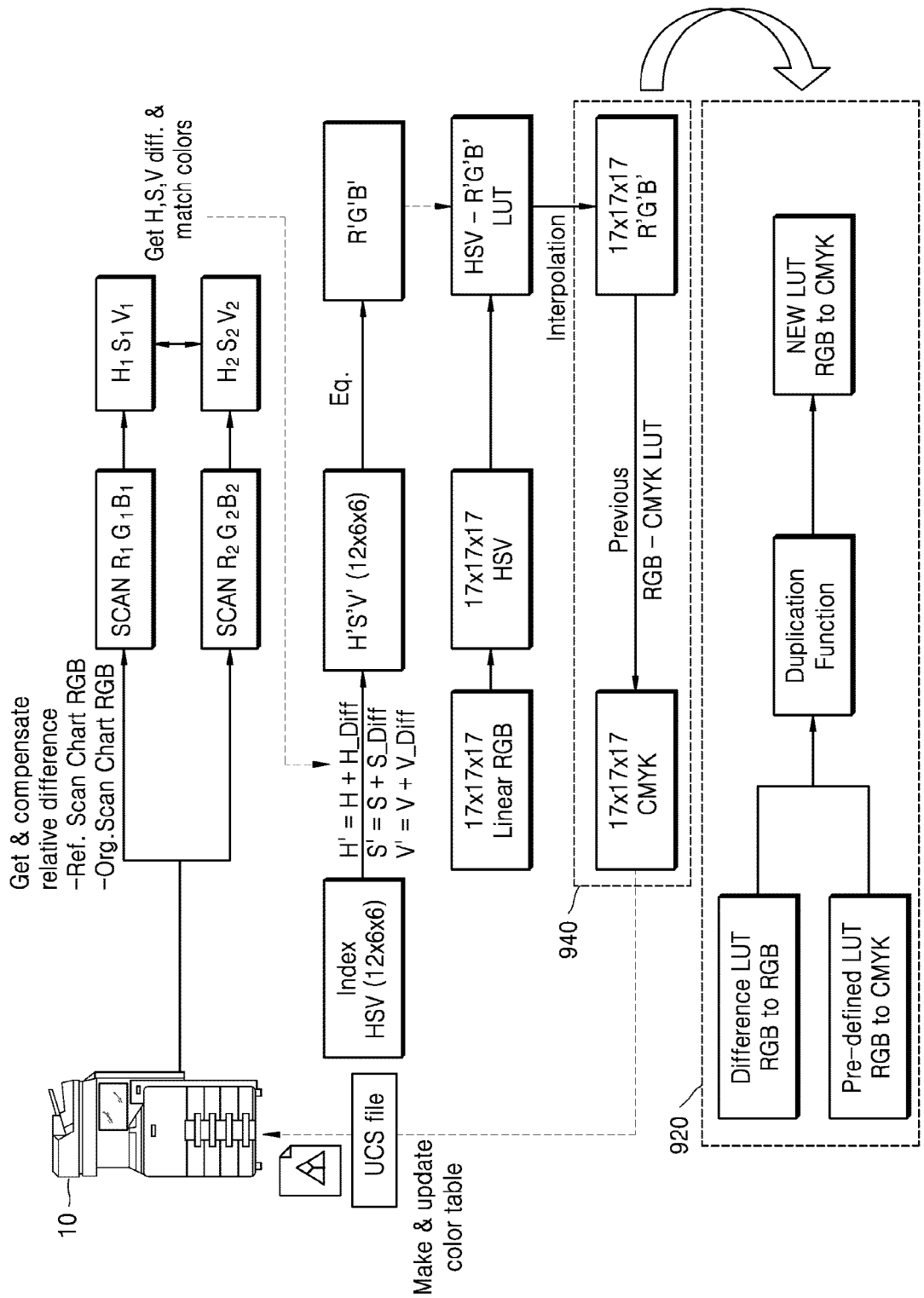

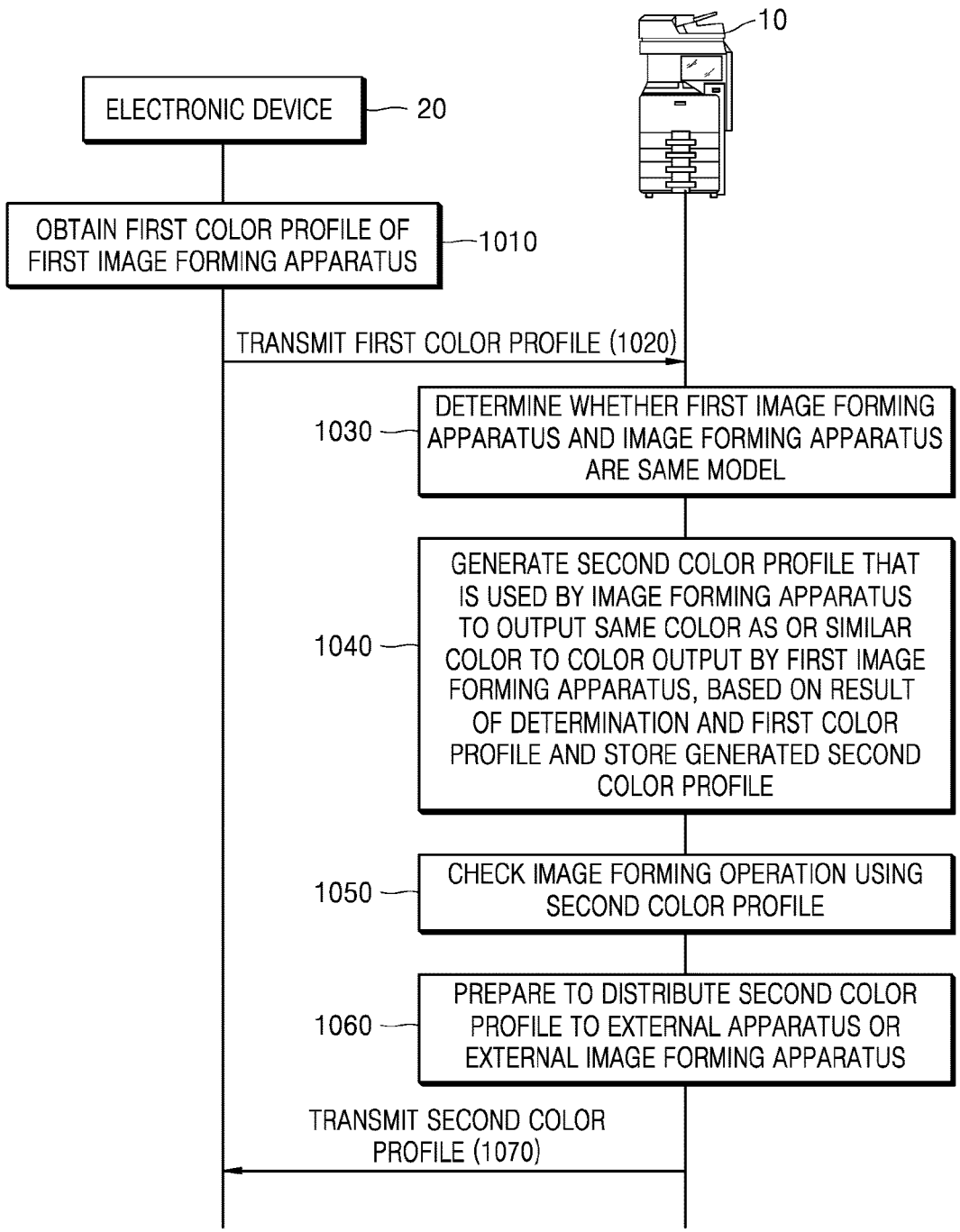
[Fig. 10]

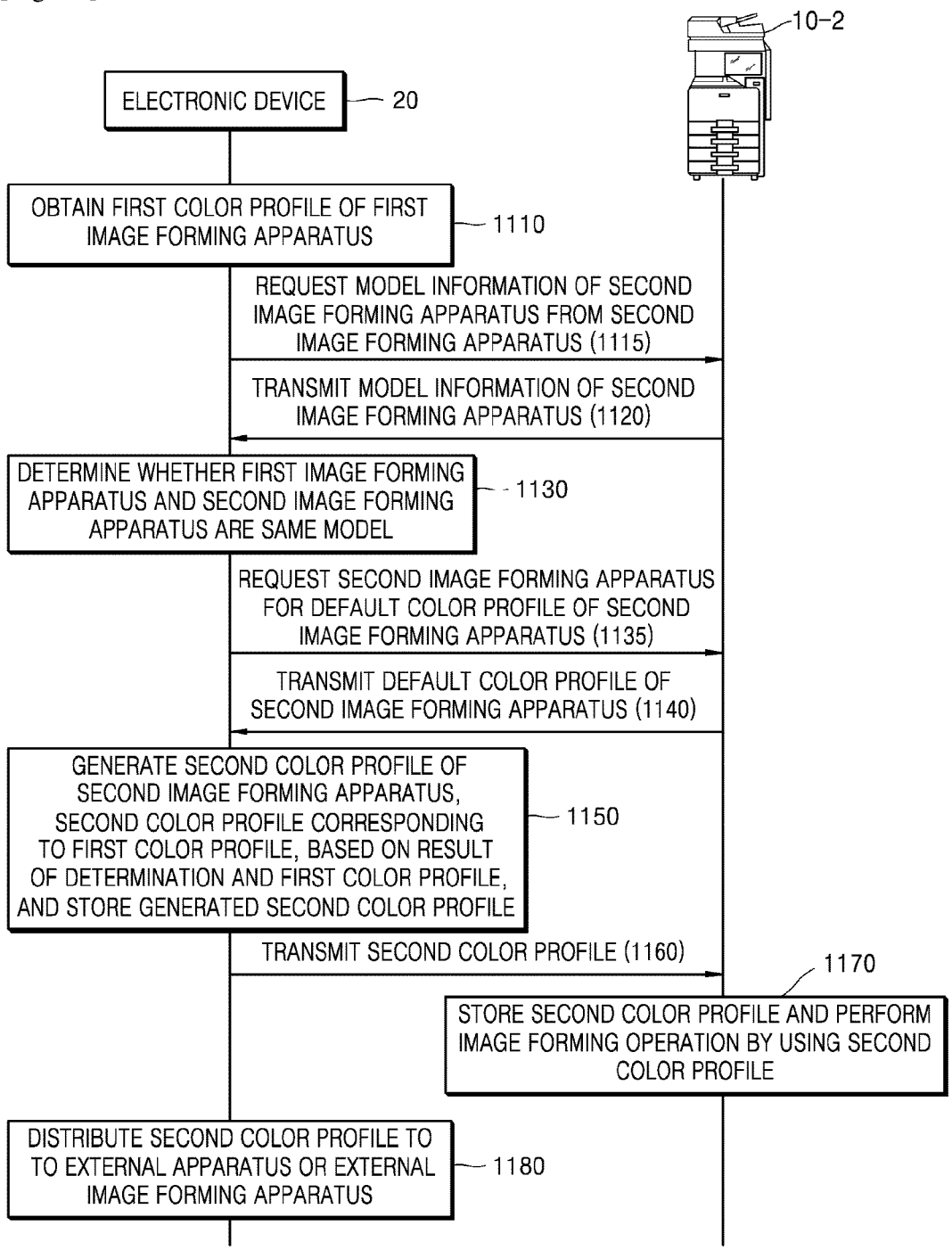

DISTRIBUTING AND MANAGING COLOR PROFILE

BACKGROUND ART

Image forming apparatuses may colorize and output printed matter via an image forming operation. Image forming apparatuses may adjust their color profiles such that a color desired by a user may be output, based on a user input. Image forming apparatuses may perform image forming operations by using the adjusted color profiles.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a conceptual view for explaining an operation, performed by an image forming apparatus, of updating a color profile, according to an example;

FIG. 2 is a block diagram illustrating a structure of an image forming apparatus, according to an example;

FIG. 3 is a flowchart of an operation, performed by an image forming apparatus, of generating a color profile, according to an example;

FIG. 4 is a view for explaining a process of setting a color profile in response to a user input, according to an example;

FIG. 5 is a view for explaining a process of distributing a generated color profile to an external image forming apparatus, according to an example;

FIG. 6 is a view for explaining a process of receiving a color profile from an external apparatus, according to an example;

FIG. 7 is a flowchart of an operation, performed by an image forming apparatus, of generating a second color profile usable by the image forming apparatus, based on a first color profile of a first image forming apparatus, according to an example;

FIG. 8 is a diagram for explaining a process of updating a color lookup table (LUT) of a second image forming apparatus, based on a color LUT generated by a first image forming apparatus, according to a user input, according to an example;

FIG. 9A is a block diagram for explaining a process of updating a red, green, blue (RGB) to cyan, magenta, yellow, black (CMYK) LUT that is used to correct a color for image formation, according to an example;

FIG. 9B illustrates graphs showing gamma values output according to adjustment levels set to adjust a brightness value, according to an example;

FIG. 9C is a schematic diagram for explaining a process, performed by an image forming apparatus, of generating a new RGB to CMYK LUT in order to duplicate a color output by a first image forming apparatus that is a different model than the image forming apparatus, according to an example;

FIG. 10 is a flowchart of a process, performed by an image forming apparatus, of generating a color profile, according to an example; and FIG. 11 is a flowchart of a process, performed by an electronic device, of generating a color profile that is to be used by an image forming apparatus, according to an example.

Throughout the drawings, like reference numerals will be understood to refer to like parts, components, and structures.

MODE FOR THE INVENTION

As used herein, the term "and/or" includes any and all combinations of one or more of the associated listed items. Expressions such as "at least one of," when preceding a list of elements, modify the entire list of elements and do not modify the individual elements of the list.

An image forming apparatus used herein may be any type of apparatus capable of performing an image forming operation, such as a printer, a scanner, a copier, a fax machine, a multi-function printer (MFP), a display apparatus, or the like. Print data, as used herein, may refer to data transformed into a format capable of being printed by a printer. A scan file, as used herein, may refer to a file obtained by scanning an image in a scanner.

Examples are described herein with reference to the accompanying drawings so that this disclosure may be easily performed by one of ordinary skill in the art to which the disclosure pertain. The disclosure may, however, be embodied in many different forms and should not be construed as being limited to the examples set forth herein.

FIG. 1 is a conceptual view for explaining an operation, performed by an image forming apparatus, of updating a color profile, according to an example.

Referring to FIG. 1, an image forming apparatus 10 may receive a first color profile 15 from an external image forming apparatus 10-1, a computer 11, or a mobile terminal 12. The first color profile 15 may include header information of the first color profile 15, model information of the external image forming apparatus 10-1, information of a first color lookup table (LUT) of the external image forming apparatus 10-1, or information of parameters that constitute the first color LUT.

The image forming apparatus 10 may determine whether the image forming apparatus 10 and the external image forming apparatus 10-1 are the same model, based on the model information of the external image forming apparatus 10-1 included in the first color profile 15. The image forming apparatus 10 may obtain the information of the first color LUT by parsing the first color profile 15.

When the image forming apparatus 10 is the same model as the external image forming apparatus 10-1, the image forming apparatus 10 may directly apply the first color LUT to an image forming operation without changing the first color LUT.

When the image forming apparatus 10 is a different model than the external image forming apparatus 10-1, the image forming apparatus 10 may generate a second color LUT that may be used by the image forming apparatus 10, based on the first color LUT. The image forming apparatus 10 may perform an image forming operation having the same or a similar color as a color output by the external image forming apparatus 10-1 via an image forming operation by using the first color LUT, by using the generated second color LUT.

FIG. 2 is a block diagram illustrating a structure of an image forming apparatus, according to an example.

Referring to FIG. 2, the image forming apparatus 10 may include a communication device 210, a user interface (UI) device 220, a memory 230, and a processor 240. However, all of the illustrated components are not essential. The image forming apparatus 10 may be implemented by more or fewer components than those illustrated in FIG. 2. The aforementioned components will now be described in more detail.

The communication device 210 may perform communication with an external apparatus. In more detail, the communication device 210 may be connected to a network by wire or wirelessly and perform communication with an external apparatus. The external apparatus may be a server, a smartphone, a tablet, a personal computer (PC), a home appliance, a medical apparatus, a camera, a wearable device, or the like. The communication device 210 may include a communication module (e.g., a transceiver) that supports one of various wired/wireless communication methods. For example, the communication module may be in the form of a chipset, or may be a sticker/barcode (e.g., a sticker including a near field communication (NFC) tag) including information necessary for communication. The communication module may be a short-range communication module or a wired communication module.

The communication device 210 may support at least one of, for example, a wireless local area network (LAN), wireless fidelity (WiFi), WiFi Direct, Bluetooth, a universal serial bus (USB), a wired LAN, NFC, or the like.

The communication device 210 may be connected to an external apparatus outside the image forming apparatus 10 and may transmit or receive a signal or data to or from the external apparatus. Referring back to FIG. 1, the image forming apparatus 10 may receive the first color profile 15 from the external image forming apparatus 10-1, the computer 11, or the mobile terminal 12 via the communication device 210. In this case, the communication device 210 may receive the first color profile 15 via Wi-Fi, Wi-Fi Direct, Bluetooth, a USB, a wired LAN, NFC, or the like.

The communication device 210 may receive, from the external apparatus or a first image forming apparatus, a first color profile that the first image forming apparatus uses to determine a color output via a first image forming operation. The first color profile may include model information of the first image forming apparatus, information of a first color LUT of the first image forming apparatus, and information of parameters that constitute the first color LUT. For example, the information of the parameters may include parameters whose values have changed to generate the first color LUT from a default color LUT of the image forming apparatus 10, and information of the values of the parameters. The parameters may include at least one of a contrast, a brightness, and a color balance that are used to correct a color based on an image forming operation.

The UI device 220 may include an input unit for receiving an input or the like for performing an image forming operation from a user, and an output unit for displaying information, such as a result of performing an image forming operation or a status of the image forming apparatus 10. For example, the UI device 220 may include a manipulation panel that receives a user input, and a display panel that displays a screen image.

In more detail, the input unit may be any of devices capable of receiving various types of user inputs, such as a keyboard, a physical button, a touch screen, a camera, a microphone, or the like. The output unit may be a display panel, a speaker, or the like. However, examples are not limited thereto, and the UI device 220 may include a device that supports various inputs and outputs.

The memory 230 may store programs, data, or files related to the image forming apparatus 10. The processor 240 may execute the programs stored in the memory 230, read the data or the files from the memory 230, or store a new file in the memory 230. The memory 230 may store program commands, data files, data structures, and the like separately or in combinations. The memory 230 may store instructions executable by the processor 240.

For example, the memory 230 may include instructions for executing an application that manages a color of the image forming apparatus 10, instructions for receiving a first color profile that the first image forming apparatus uses to determine a color output via the first image forming operation from the external apparatus or the first image forming apparatus via the application, instructions for determining whether the first image forming apparatus and the image forming apparatus 10 are the same model, based on the first color profile, instructions for generating a second color profile that the image forming apparatus 10 uses to output the same or a similar color to the color output via the first image forming operation, based on a result of the determination and the first color profile, and instructions for performing an image forming operation by using the second color profile.

The processor 240 may control an overall operation of the image forming apparatus 10, and at least one processor 240, such as a central processing unit (CPU), may be included. The processor 240 may control the other components included in the image forming apparatus 10 to perform an operation corresponding to a user input received via the UI device 220. The processor 240 may include at least one specialized processor 240 corresponding to each function, or may be an integrated processor 240.

As described above, the processor 240 may execute the programs stored in the memory 230, read the data or files from the memory 230, or store a new file in the memory 230. The processor 240 may execute the instructions stored in the memory 230.

The processor 240 may receive the first color profile that the first image forming apparatus uses to determine the color output via the first image forming operation, from the external apparatus or the first image forming apparatus via the communication device 210.

For example, the processor 240 may search for a plurality of image forming apparatuses connected to the image forming apparatus 10, via the communication device 210. The processor 240 may control the UI device 220 to display a result of the searching. The processor 240 may receive an input of selecting the first image forming apparatus from the plurality of image forming apparatuses, via the UI device 220. The processor 240 may control the UI device 220 to display at least one color profile stored in the first image forming apparatus and information related to the at least one color profile. The processor 240 may receive an input of selecting the first color profile, which is to be used by the image forming apparatus 10 during an image forming operation, from the at least one color profile, via the UI device 220. The processor 240 may receive the first color profile from the first image forming apparatus via the communication device 210.

The processor 240 may determine whether the first image forming apparatus and the image forming apparatus 10 are the same model, based on the first color profile. The processor 240 may generate the second color profile that the image forming apparatus 10 uses to output the same or a similar color to the color output via the first image forming operation, based on a result of the determination and the first color profile.

A color output via an image forming operation of the image forming apparatus 10 may be determined based on a color profile. For example, the color may be determined based on a color LUT within the color profile. The color LUT may be determined in consideration of the characteristics of the image forming apparatus 10. Accordingly, when the image forming apparatus 10 performs an image forming operation by using a color profile of an image forming apparatus that is a different model than the image forming apparatus 10, a color output by the image forming apparatus 10 may be different from a color output by the image forming apparatus that is a different model than the image forming apparatus 10.

When the image forming apparatus 10 is a different model than the first image forming apparatus, the image forming apparatus 10 may generate the second color profile corresponding to the first color profile by referring to the first color profile, in order to output the same or a similar color to a color output by the first image forming apparatus via an image forming operation by using the first color profile. In more detail, the processor 240 may receive a default color profile of the first image forming apparatus and the first color profile from the external apparatus or the first image forming apparatus via the communication device 210. The processor 240 may obtain data corrected from the default color profile of the first image forming apparatus to the first color profile, based on the default color profile of the first image forming apparatus and the first color profile. The processor 240 may generate the second color profile corresponding to the first color profile by correcting a default color profile of the image forming apparatus 10, based on the data corrected from the default color profile of the first image forming apparatus to the first color profile.

For example, the processor 240 may receive color information corrected to generate the first color LUT within the first color profile from the external apparatus or the first image forming apparatus via the communication device 210. The processor 240 may generate the second color profile corresponding to the first color profile, based on the color information corrected to generate the first color LUT within the first color profile in the first image forming apparatus. In other words, the processor 240 may generate the second color profile corresponding to the first color profile, based on information of the value of a parameter corrected to generate the first color LUT within the first color profile in the first image forming apparatus and a default color LUT of the image forming apparatus 10. In more detail, the processor 240 may correct the value of a parameter within the default color LUT of the image forming apparatus 10, the parameter corresponding to the corrected parameter within the first color LUT, based on the value of the corrected parameter within the first color LUT. The processor 240 may generate a second color LUT corresponding to the first color LUT, based on information of the value of the corrected parameter within the default color LUT of the image forming apparatus 10. The second color LUT may be one of a red, green, blue (RGB) to cyan, magenta, yellow, black (CMYK) LUT and a Gamma LUT, which are used to correct a color of image formation in the image forming apparatus 10.

On the other hand, when the image forming apparatus 10 is the same model as the first image forming apparatus, the processor 240 may store the first color profile as a color profile usable by the image forming apparatus 10 in the memory 230.

The processor 240 may control the UI device 220 to display a screen image for setting a color profile that may be used by the image forming apparatus 10 during an image forming operation. The processor 240 may receive an input of adjusting the value of a parameter for use in correcting a color difference during image formation, via the UI device 220 and may generate a customized color profile, based on the received input. The parameter may include at least one of a contrast, a brightness, and a color balance. The processor 240 may display a list of parameters via the UI device 220, and, in response to an input of selecting a first parameter from the list, may display a UI for adjusting the value of the first parameter.

The processor 240 may transmit the customized color profile to an external image forming apparatus or an external apparatus managing the external image forming apparatus via the communication device 210. As an example, the processor 240 may transmit the customized color profile to the external image forming apparatus or the external apparatus managing the external image forming apparatus via the communication device 210 based on information indicating that a user who has set the customized color profile has logged in to the external image forming apparatus. For example, the processor 240 may transmit the customized color profile to the external image forming apparatus to which the user having set the customized color profile has logged in, via the communication device 210.

Based on information of the external image forming apparatus having performed a similar image forming operation to the image forming operation performed by the image forming apparatus 10, the processor 240 may transmit the customized color profile to the external image forming apparatus or the external apparatus managing the external image forming apparatus via the communication device 210. For example, the processor 240 may transmit the customized color profile to the external image forming apparatus required to output the same or a similar color to the color output via an image forming operation performed by the image forming apparatus 10, via the communication device 210.

When the image forming apparatus 10 receives a color profile from the external image forming apparatus or the external apparatus, the image forming apparatus 10 may correct the received color profile to a color profile suitable for the image forming apparatus 10.

The image forming apparatus 10 may transmit the color profile generated by the image forming apparatus 10 to the external image forming apparatus or the external apparatus. In more detail, the image forming apparatus 10 may transmit the color profile generated by the image forming apparatus 10 to an image forming apparatus that is the same model as the image forming apparatus 10, without changing the color profile. Alternatively, the image forming apparatus 10 may change the color profile generated by the image forming apparatus 10 to a color profile suitable for an image forming apparatus that is a different model than the image forming apparatus 10, and transmit the changed color profile to the image forming apparatus that is a different model than the image forming apparatus 10. In other words, the image forming apparatus 10 may distribute the color profile generated by the image forming apparatus 10 to the external image forming apparatus or the external apparatus, without an additional manipulation of a user.

The image forming apparatus 10 may include an image forming operation unit (not shown). The image forming operation unit may perform an image forming operation, such as printing, scanning, copying, or faxing. The image forming operation unit may include a printing unit, a scanning unit, a copying unit, and a faxing unit, may include only some of the printing unit, the scanning unit, the copying unit, and the faxing unit, or may further include a component for performing another type of image forming operation, in addition to the printing unit, the scanning unit, the copying unit, and the faxing unit.

The image forming apparatus 10 may perform an image forming operation, based on the second color profile corresponding to the first color profile. For example, the image forming apparatus 10 may generate a second RGB to CMYK LUT suitable for the image forming apparatus 10, based on a first RGB to CMYK LUT received from the external apparatus or the first image forming apparatus, and may perform an image forming operation by using the generated second RGB to CMYK LUT.

Various operations or applications that the image forming apparatus 10 executes will now be described. However, matters to be clearly understood and expected by one of ordinary skill in the art to which the disclosure pertains may be understood by typical implementations even when none of the communication device 210, the UI device 220, the memory 230, and the processor 240 is specified, and the scope of the disclosure is not limited by the titles or physical/logical structures of specified components.

FIG. 3 is a flowchart of an operation, performed by an image forming apparatus, of generating a color profile, according to an example.

Referring to FIG. 3, the UI device 220 of the image forming apparatus 10 may display a screen image for setting a color profile that is to be used in an image forming operation in operation 310.

In operation 320, the UI device 220 of the image forming apparatus 10 may receive an input of adjusting the value of a parameter that is used to correct a color difference during image formation.

In operation 330, the image forming apparatus 10 may generate the color profile, based on the received input.

FIG. 4 is a view for explaining a process of setting a color profile in response to a user input, according to an example.

Referring to FIG. 4, the UI device 220 may display a screen image for setting a color profile that is to be used in an image forming operation. For example, the UI device 220 may display a list 410 including parameters that are used to correct a color difference in an image forming operation. The parameters may include at least one of a color balance, a brightness, a contrast, and a saturation. The list 410 may include icons representing the parameters, and an icon for resetting the values of the parameters.

In response to an input of selecting a first parameter from the list 410, the UI device 220 may display a UI 420 for adjusting the value of the first parameter. For example, the UI device 220 may receive an input of selecting the "color balance" parameter from the list 410. The UI device 220 may display an icon for adjusting a cyan color, a magenta color, a yellow color, and a key (black) color, which are CMYK colors within the "color balance" parameter, or an icon for adjusting a red color, a green color, and a blue color, which are RGB colors.

The UI device 220 may receive an input of adjusting the value of the first parameter selected by a user. The image forming apparatus 10 may generate a customized color profile, based on the input of adjusting the value of the first parameter.

FIG. 5 is a view for explaining a process of distributing a generated color profile to an external image forming apparatus, according to an example.

Referring to FIG. 5, the image forming apparatus 10 may distribute a color profile stored in the image forming apparatus 10 to an external image forming apparatus. Referring to an image 510, the UI device 220 may display color profiles stored in the image forming apparatus 10. For example, the UI device 220 may classify the color profiles into a default color profile provided by the image forming apparatus 10 and a customized color profile set by a user, and display the classified color profiles. The UI device 220 may receive an input of selecting a certain color profile from the color profiles displayed on the screen, and an input of selecting an icon 511 for transmitting the selected color profile to the external image forming apparatus.

Referring to an image 520, in response to selecting the icon 511 for transmitting the color profile selected by the UI device 220 to the external image forming apparatus, the image forming apparatus 10 may search for a plurality of image forming apparatuses connected to the image forming apparatus 10. The UI device 220 may display a list 521 including information of the found plurality of image forming apparatuses. For example, the list 521 may include model information, an address, a location, or the like of each of the plurality of image forming apparatuses and information of the color profiles.

The UI device 220 may receive an input of selecting at least one image forming apparatus that is to receive the selected color profile from the plurality of image forming apparatuses. The image forming apparatus 10 may transmit the selected color profile to the selected at least one image forming apparatus. For example, the image forming apparatus 10 may transmit the selected color profile to an image forming apparatus that is the same model as the image forming apparatus 10, without changing the selected color profile. As another example, the image forming apparatus 10 may change the selected color profile to a color profile corresponding to an image forming apparatus that is a different model than the image forming apparatus 10, and may transmit the changed color profile to the image forming apparatus that is a different model than the image forming apparatus 10. In this case, the image forming apparatus 10 may transmit a color profile to an external image forming apparatus via a wired network or a wireless network (for example, Wi-Fi Direct or Bluetooth). The external image forming apparatus may receive the color profile of the image forming apparatus 10 via a USB.

FIG. 6 is a view for explaining a process of receiving a color profile from an external apparatus, according to an example.

Referring to FIG. 6, the UI device 220 may display a menu for providing functions related to a color profile. For example, the menu may include an icon for transmitting a color profile to an external apparatus, an icon for receiving a color profile from an external apparatus, an icon for storing a color profile, an icon for initializing a color profile, an icon for renaming a color profile, an icon for displaying information of a color profile, or the like. Referring to an image 610, the UI device 220 may receive an input of selecting an icon 611 for receiving a color profile from an external apparatus.

Referring to an image 620, in response to selecting the icon 611 for receiving a color profile from an external apparatus, the UI device 220 may search for a plurality of image forming apparatuses and a plurality of external apparatuses connected to the image forming apparatus 10. The image forming apparatus 10 may receive color profiles and information related to the color profiles from the found plurality of image forming apparatuses and the found plurality of external apparatuses. The information related with the color profiles may include information, such as names of the color profiles and parameters within the color profiles.

The UI device 220 may display a list 621 including information of the found plurality of image forming apparatuses and the found plurality of external apparatuses. For example, the list 621 may include a first image forming apparatus, a second image forming apparatus, a first terminal, and a first server as a result of the searching. In response to an input of selecting the first image forming apparatus, the UI device 220 may display a plurality of color profiles 622 stored in the first image forming apparatus. The UI device 220 may receive an input of selecting a color profile "second brightness adjustment_color profile" from the plurality of color profiles 622. The image forming apparatus 10 may receive the color profile "second brightness adjustment_ color profile" from the first image forming apparatus. In this case, the image forming apparatus 10 may receive the color profile "second brightness adjustment_color profile" from the first image forming apparatus via a wired network or a wireless network (for example, Wi-Fi Direct or Bluetooth). Alternatively, the image forming apparatus 10 may receive the color profile "second brightness adjustment_color profile" from the first image forming apparatus via a USB.

FIG. 7 is a flowchart of an operation, performed by an image forming apparatus, of generating a second color profile usable by the image forming apparatus, based on a first color profile of a first image forming apparatus, according to an example.

Referring to FIG. 7, the image forming apparatus 10 may receive, from an external apparatus or the first image forming apparatus, a first color profile that the first image forming apparatus uses to determine a color output via a first image forming operation in operation 710. The first color profile may include model information of the first image forming apparatus, information of a first color LUT of the first image forming apparatus, and information of parameters that constitute the first color LUT. For example, the information of the parameters may include parameters whose values have changed to generate the first color LUT from a default color LUT of the first image forming apparatus, and information of the values of the parameters. The parameters may include at least one of a contrast, a brightness, and a color balance that are used to correct a color based on an image forming operation.

In operation 720, the image forming apparatus 10 may determine whether the first image forming apparatus and the image forming apparatus 10 are the same model, based on the first color profile. For example, the image forming apparatus 10 may obtain model information of the first image forming apparatus by parsing the first color profile. The image forming apparatus 10 may determine whether the image forming apparatus 10 is the same model as the first image forming apparatus, by comparing the obtained model information of the first image forming apparatus with model information of the image forming apparatus 10 stored in the image forming apparatus 10.

In operation 730, it may be determined whether the first image forming apparatus and the image forming apparatus 10 are the same model. When the first image forming apparatus and the image forming apparatus 10 are different models, the image forming apparatus 10 may perform operation 740. On the other hand, when the first image forming apparatus and the image forming apparatus 10 are the same model, the image forming apparatus 10 may perform operation 750.

In operation 740, the image forming apparatus 10 may generate a second color profile corresponding to the first color profile, based on the first color profile and a default color profile of the image forming apparatus 10.

The image forming apparatus 10 may generate the second color profile corresponding to the first color profile by correcting the default color profile of the image forming apparatus 10, based on data corrected from the default color profile of the first image forming apparatus to the first color profile.

For example, the image forming apparatus 10 may generate the second color profile corresponding to the first color profile, based on information of the value of a parameter corrected to generate the first color LUT within the first color profile in the first image forming apparatus and a default color LUT of the image forming apparatus 10.

In more detail, the image forming apparatus 10 may correct the value of a parameter within the default color LUT of the image forming apparatus 10, the parameter corresponding to the corrected parameter within the first color LUT, based on the value of the corrected parameter within the first color LUT. The image forming apparatus 10 may generate a second color LUT corresponding to the first color LUT, based on information of the value of the corrected parameter within the default color LUT of the image forming apparatus 10.

In operation 750, the image forming apparatus 10 may store the first color profile as a color profile usable by the image forming apparatus 10, in a memory.

FIG. 8 is a diagram for explaining a process of updating a color LUT of a second image forming apparatus, based on a color LUT generated by a first image forming apparatus, according to a user input, according to an example.

Referring to FIG. 8, the first image forming apparatus 10-1 may perform an application for correcting a color, the application installed in the first image forming apparatus 10-1. As the application for correcting a color is performed, the first image forming apparatus 10-1 may generate a customized color profile, based on a user input. For example, the first image forming apparatus 10-1 may display a default color profile of the first image forming apparatus 10-1 on a first UI device of the first image forming apparatus 10-1. The first UI device may receive an input of adjusting parameters within the default color profile.

For example, the first UI device may receive an input of adjusting the value of a brightness parameter to 90, the value of a cyan-red balance parameter to 65, and the value of a contrast parameter to 45. The first image forming apparatus 10-1 may generate a customized color profile 810, based on the changed values of the parameters.

For example, the customized color profile 810 may include model information of the first image forming apparatus 10-1, information of a customized color LUT, and information of the parameters that constitute the customized color LUT. For example, the customized color LUT may be an RGB to CMYK LUT that is based on a user input.

The first image forming apparatus 10-1 may provide the customized color profile 810 to a second image forming apparatus 10-2 which is to update a color profile by using the customized color profile 810.

The second image forming apparatus 10-2 may determine whether the first image forming apparatus 10-1 and the second image forming apparatus 10-2 are the same model, based on the customized color profile 810. If the first image forming apparatus 10-1 and the second image forming apparatus 10-2 are different models, the second image forming apparatus 10-2 may generate a customized color LUT' usable by the second image forming apparatus 10-2, based on the customized color profile 810 and a default color profile 820 of the second image forming apparatus 10-2.

For example, the second image forming apparatus 10-2 may correct the values of the parameters within a default color LUT of the second image forming apparatus 10-2, based on information of the values of parameters corrected while a customized color LUT of the customized color profile 810 is being generated. The second image forming apparatus 10-2 may generate the customized color LUT' usable by the second image forming apparatus 10-2, based on information of the values of the corrected parameters within the default color LUT of the second image forming apparatus 10-2. The second image forming apparatus 10-2 may obtain an updated color profile 830 by adding the customized color LUT' to the default color profile 820.

Referring to a block 840 of FIG. 8, the second image forming apparatus 10-2 may output an image in a color desired by a user, by using the customized color LUT', when performing an image forming operation.

FIG. 9A is a block diagram for explaining a process of updating an RGB to CMYK LUT that is used to correct a color for image formation, according to an example.

Referring to FIG. 9A, a default RGB to CMYK LUT of the image forming apparatus 10 is an LUT having C, M, Y, and K values for R, G, and B inputs having a lattice point. For example, input values of R, G, and B may be mapped on a three-dimensional (3D) orthogonal coordinate system having axes respectively corresponding to R, G, and B. The axes respectively corresponding to R, G, and B are divided into 17 equal axes. In a direction from an origin point to the outside, input values of each lattice point are 0, 16, 32, 48, 64, 80, 96, 112, 128, 144, 160, 176, 192, 208, 224, 240, and 255. The image forming apparatus 10 may sequentially store 4913 C, M, Y, and K values respectively corresponding to (0,0,0), (0,0,16), (0,0,32), . . . (0,16,0), . . . , and (255, 255, 255) with respect to (R,G,B). The memory 230 of the image forming apparatus 10 may use 19652 (=4913×4) bytes to store the default RGB to CMYK LUT.

For example, the image forming apparatus 10 may store the C, M, Y, and K values according to a code shown in Table 1. The code shown in Table 1 is an example and the image forming apparatus 10 may store the C, M, Y, and K values according to a code other than the code shown in Table 1.

TABLE 1

```
const U8 pucSAMPLE_PRINTING_RGB2CMYK_LUT_VALUES[ ] =
{
        64,   80,    84,    1,   //  (R,G,B) = 0,0,0
        44,   71,   105,   49,   //  (R,G,B) = 0,0,16
        21,   54,   119,   76,
         3,   31,   130,  108,
         1,   18,   143,  141,
         1,   16,   158,  170,
         1,   15,   172,  197,
         1,   21,   183,  217,
         1,   26,   195,  233,
         1,   31,   204,  242,
         1,   35,   214,  248,
         1,   39,   223,  251,
         1,   44,   231,  253,
         1,   48,   238,  254,
    // ...
       244,  255,   124,  255,
       246,  255,   147,  255,
       248,  255,   171,  255,
       250,  255,   194,  255,
       252,  255,   217,  255,
       254,  255,   238,  255,   //  (R,G,B) = 255, 255, 240
       255,  255,   255,  255,   //  (R,G,B) = 255, 255, 255
};
```

Referring to a block diagram 910 of FIG. 9A, when a color is desired to be corrected to a brighter color than a color of the default RGB to CMYK LUT of the image forming apparatus 10, the image forming apparatus 10 may generate a new RGB to CMYK LUT by applying the default RGB to CMYK LUT of the image forming apparatus 10 and an input of adjusting the value of a brightness parameter (for example, an input of increasing a brightness value to 100) to an adjustment function. The adjustment function may be an expression set with respect to a standard parameter by a user. For example, the image forming apparatus 10 may set a brightness adjustment level to 0 to 100 in order to adjust the brightness, and may set an adjustment level of 50 as a default value. When the adjustment level is a default value, the image forming apparatus 10 may use the default RGB to CMYK LUT as an RGB to CMYK LUT without changing the default RGB to CMYK LUT.

The image forming apparatus 10 may generate a 1D gamma table for adjusting a brightness value, according to the adjustment level. When the adjustment level is greater than 50, the image forming apparatus 10 may output a color with a brightness value greater than the default value. When the adjustment level is less than 50, the image forming apparatus 10 may output a color with a brightness value less than the default value.

FIG. 9B illustrates graphs showing gamma values output according to adjustment levels set to adjust a brightness value, according to an example.

Referring to FIG. 9B, when the adjustment level is 50, the image forming apparatus 10 may generate a gamma value, as shown in graph 911. When the adjustment level is greater than 50, the image forming apparatus 10 may generate a gamma value, as shown in graph 912. When the adjustment level is less than 50, the image forming apparatus 10 may generate a gamma value, as shown in graph 913.

For example, the image forming apparatus 10 may generate a 1D gamma table according to a code shown in Table 2. In Table 2, U8 indicates an unsigned character, and nLevel indicates an adjustment level for brightness adjustment. The code shown in Table 2 is an example and the image forming apparatus 10 may generate a 1D gamma table according to a code other than the code shown in Table 2.

TABLE 2

```
void UpdateLUTwithBrighnessLevel (int nLevel, U8* in_clut,
U8*out_clut)
{
    int i =0, j=0, k=0;
    U8* brightness_gamma[256] = {0, } ;
    GenerateBrightnessGamma (nLevel, brightness_gamma);
    U8* pInCMYK = in_clut;
    U8* pOutCMYK = out_clut;
    for(i=0; i<17; i++)
    {
        for(j=0; j<17; j++)
        {
            for(k=0; j<17; k++)
            {
                U8 C= pInCMYK [0];
                U8 M= pInCMYK [1];
                U8 Y= pInCMYK [2];
                U8 K= pInCMYK [3];
                // Getting new CMYK value
                pOutCMYK[0] = brightness_gamma [C];
                pOutCMYK[1] = brightness_gamma [M];
                pOutCMYK[2] = brightness_gamma [Y];
                pOutCMYK[3] = brightness_gamma [K];
                pInCMYK += 4;
                pOutCMYK += 4;
            }
        }
    }
}
```

The image forming apparatus 10 may generate the new RGB to CMYK LUT to which the default RGB to CMYK LUT has been changed, based on the value of a brightness adjustment level that adjusts a brightness value to the color of the default RGB to CMYK LUT of the image forming apparatus 10.

Referring to a block diagram 920 of FIG. 9A, when the second image forming apparatus 10-2 desires to apply a first color profile of the first image forming apparatus 10-1 that is a different model than the second image forming apparatus 10-2, the second image forming apparatus 10-2 may obtain an RGB to RGB LUT representing a difference between an RGB profile based on the first color profile and an RGB profile based on the default color profile of the second image forming apparatus 10-2. The second image forming apparatus 10-2 may generate a new RGB to CMYK LUT by applying the RGB to RGB LUT and the default RGB to CMYK LUT of the second image forming apparatus 10-2 to a duplication function. The duplication function may be a function set to realize, in the second image forming apparatus 10-2, the same or a similar color as a color of the first color profile of the first image forming apparatus 10-1.

Referring to a block diagram 930 of FIG. 9A, when the image forming apparatus 10 desires to generate an RGB to CMYK LUT based on an input RGB to profile connection space (PCS) profile, the image forming apparatus 10 may generate a new RGB to CMYK LUT by applying the input RGB to PCS profile and a standard PCS to CMYK profile of the image forming apparatus 10 to a merge function. The merge function may be a function that is output in an RGB to CMYK profile format via a merger between an RGB to PCS profile and a PCS to CMYK profile.

FIG. 9C is a schematic diagram for explaining a process, performed by an image forming apparatus, of generating a new RGB to CMYK LUT in order to duplicate a color output by a first image forming apparatus that is a different model than the image forming apparatus, according to an example.

Referring to FIG. 9C, the image forming apparatus 10 may scan a standard color chart of the image forming apparatus 10 and a reference color chart of the first image forming apparatus and thus obtain processable image information. Image information of a scanned color chart may be expressed in an RGB color, the standard color chart of the image forming apparatus 10 may be displayed as R1G1B1, and the reference color chart of the first image forming apparatus may be displayed as R2G2B2. Based on a transformation algorithm from an RGB color to a hue, saturation, value (HSV) color, the image forming apparatus 10 may transform R1G1B1, being image information of the standard color chart of the image forming apparatus 10, into H1S1V1, and transform R2G2B2, being image information of the reference color chart of the first image forming apparatus, into H2S2V2.

The image forming apparatus 10 may compare an H1S1V1 color with an H2S2V2 color and thus obtain a difference in an HSV color. In more detail, a difference in a color value may be divided into a hue difference H Diff, a chroma difference S Diff, and a contrast difference V Diff and may be determined. The image forming apparatus 10 may determine new H', S', and V' color values of the image forming apparatus 10, based on the hue difference H Diff, the chroma difference S Diff, and the contrast difference V Diff. The image forming apparatus 10 may transform the new H', S', and V' color values into R', G', and B' color values, based on an inverse transformation algorithm from the RGB color to the HSV color. Referring to a block diagram 940 of FIG. 9C, the image forming apparatus 10 may generate a new RGB to CMYK LUT, based on the R', G', and B' color values and the default RGB to CMYK LUT of the image forming apparatus 10. An operation of the image forming apparatus 10 according to the block diagram 940 of FIG. 9C may correspond to an operation of the second image forming apparatus 10-2 according to the block diagram 920 of FIG. 9A.

FIG. 10 is a flowchart of a process, performed by an image forming apparatus, of generating a color profile, according to an example.

Referring to FIG. 10, an electronic device 20 may obtain a first color profile of a first image forming apparatus in operation 1010.

In operation 1020, the electronic device 20 may transmit the first color profile to the image forming apparatus 10.

In operation 1030, the image forming apparatus 10 may determine whether the first image forming apparatus and the image forming apparatus 10 are the same model, based on the first color profile.

In operation 1040, based on a result of the determination and the first color profile, the image forming apparatus 10 may generate a second color profile that is used by the image forming apparatus 10 to output the same or a similar color to a color output by the first image forming apparatus. The image forming apparatus 10 may store the generated second color profile.

In operation 1050, the image forming apparatus 10 may check an image forming operation using the second color profile.

In operation 1060, the image forming apparatus 10 may prepare to distribute the second color profile to an external apparatus or an external image forming apparatus.

In operation 1070, the image forming apparatus 10 may transmit the second color profile to the electronic device 20. The electronic device 20 may distribute the second color profile to an image forming apparatus other than the image forming apparatus 10.

FIG. 11 is a flowchart of a process, performed by an electronic device, of generating a color profile that is to be used by an image forming apparatus, according to an example.

Referring to FIG. 11, the electronic device 20 may obtain a first color profile of the first image forming apparatus 10-1 in operation 1110.

In operation 1115, the electronic device 20 may request model information of the second image forming apparatus 10-2, which is to perform an image forming operation based on the first color profile, from the second image forming apparatus 10-2. In operation 1120, the second image forming apparatus 10-2 may transmit the model information of the second image forming apparatus 10-2 to the electronic device 20.

In operation 1130, the electronic device 20 may compare model information of the first image forming apparatus 10-1 obtained from the first color profile with the received model information of the second image forming apparatus 10-2 to thereby determine whether the first image forming apparatus 10-1 and the second image forming apparatus 10-2 are the same model.

In operation 1135, when the first image forming apparatus 10-1 and the second image forming apparatus 10-2 are different models, the electronic device 20 may request the second image forming apparatus 10-2 for a default color profile of the second image forming apparatus 10-2. In operation 1140, the second image forming apparatus 10-2 may transmit the default color profile of the second image forming apparatus 10-2 to the electronic device 20.

In operation 1150, the electronic device 20 may generate a second color profile of the second image forming apparatus 10-2, the second color profile corresponding to the first color profile, based on a result of the determination and the first color profile, and store the generated second color profile.

For example, when the first image forming apparatus 10-1 and the second image forming apparatus 10-2 are different models, the electronic device 20 may obtain data corrected from a default color profile of the first image forming apparatus 10-1 to the first color profile. The electronic device 20 may generate the second color profile corresponding to the first color profile by correcting the default color profile of the second image forming apparatus 10-2, based on the corrected data.

For example, when the first image forming apparatus 10-1 and the second image forming apparatus 10-2 are different models, the electronic device 20 may obtain information of the value of a parameter corrected to generate a first color LUT within the first color profile of the first image forming apparatus 10-1. The electronic device 20 may generate the second color profile corresponding to the first color profile, based on the information of the value of the corrected parameter of the first image forming apparatus 10-1 and the default color profile of the second image forming apparatus 10-2. In more detail, the electronic device 20 may correct the value of a parameter within the default color LUT of the second image forming apparatus 10-2, the parameter corresponding to the corrected parameter within the first color LUT, based on the value of the corrected parameter within the first color LUT. The electronic device 20 may generate a second color LUT corresponding to the first color LUT, based on information of the value of the corrected parameter within the default color LUT of the second image forming apparatus 10-2.

For example, when the first image forming apparatus 10-1 and the second image forming apparatus 10-2 are the same model, the electronic device 20 may store the first color profile as a color profile usable by the second image forming apparatus 10-2 without correcting the default color profile of the second image forming apparatus 10-2.

In operation 1160, the electronic device 20 may transmit the second color profile to the second image forming apparatus 10-2.

In operation 1170, the second image forming apparatus 10-2 may store the second color profile in a memory and may perform an image forming operation by using the second color profile.

In operation 1180, the electronic device 20 may distribute the second color profile to an external apparatus or an external image forming apparatus.

The above-described methods of operating the image forming apparatus 10 and the electronic device 20 may be embodied in the form of a computer-readable recording medium storing computer-executable instructions or data. The above-described examples can be written as computer programs and can be implemented in general-use digital computers that execute the programs using a computer-readable recording medium. Examples of the computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

The invention claimed is:

1. An image forming apparatus comprising:
   a communication device to communicate with an external apparatus;
   a processor;
   a memory to store instructions executable by the processor; and
   a user interface (UI) device to receive a user input and display information related to the image forming apparatus,
   wherein the processor executes the instructions to:
   receive, from the external apparatus or a first image forming apparatus via the communication device, a first color profile that the first image forming apparatus uses to determine a color output via a first image forming operation;
   determine whether the first image forming apparatus and the image forming apparatus are a same model, based on the first color profile;
   generate a second color profile that the image forming apparatus uses to output the same or a similar color to the color output via the first image forming operation, based on a result of the determination and the first color profile; and
   when the first image forming apparatus and the image forming apparatus are different models, generate the second color profile corresponding to the first color profile based on information of a value of a parameter corrected to generate a first color lookup table (LUT) within the first color profile in the first image forming apparatus and a default color LUT of the image forming apparatus.

2. The image forming apparatus of claim 1, wherein the processor executes the instructions to:
   correct a value of a parameter within the default color LUT of the image forming apparatus, the parameter corresponding to the corrected parameter within the first color LUT, based on the value of the corrected parameter within the first color LUT; and
   generate a second color LUT corresponding to the first color LUT, based on information of the value of the corrected parameter within the default color LUT of the image forming apparatus.

3. The image forming apparatus of claim 1,
   wherein the first color profile comprises model information of the first image forming apparatus, information of the first color LUT of the first image forming apparatus, and information of parameters that constitute the first color LUT, and
wherein the parameters comprise at least one of a contrast, a brightness, or a color balance that are used to correct a color based on an image forming operation.

4. The image forming apparatus of claim 1, wherein the processor executes the instructions to, when the image forming apparatus is the same model as the first image forming apparatus, store the first color profile as a color profile usable by the image forming apparatus in the memory.

5. The image forming apparatus of claim 1, wherein the processor executes the instructions to:
search for a plurality of image forming apparatuses connected to the image forming apparatus and display a result of the searching on the UI device;
receive an input of selecting the first image forming apparatus from among the plurality of image forming apparatuses via the UI device;
display, on the UI device, at least one color profile stored in the first image forming apparatus and information related to the at least one color profile; and
receive an input of selecting the first color profile, which is to be used by the image forming apparatus during an image forming operation, from the at least one color profile, via the UI device.

6. The image forming apparatus of claim 1, wherein the processor executes the instructions to:
display, on the UI device, a screen image for setting a color profile that is to be used by the image forming apparatus during an image forming operation;
receive, via the UI device, an input of adjusting a value of a parameter that is used to correct a color difference during the image forming operation; and
generate a customized color profile, based on the input.

7. The image forming apparatus of claim 6, wherein the processor executes the instructions to display a list of the parameters on the screen image, and, in response to an input of selecting a first parameter from the list, display a UI for adjusting a value of the first parameter.

8. The image forming apparatus of claim 6, wherein the processor executes the instructions to transmit the customized color profile to an external image forming apparatus via the communication device, based on information indicating that a user who has set the customized color profile has logged in to the external image forming apparatus or information of the external image forming apparatus that has performed a similar image forming operation to an image forming operation performed by the image forming apparatus.

9. A non-transitory computer-readable recording medium having recorded thereon instructions executable by a processor, the instructions comprising:
instructions to execute an application that manages a color of an image forming apparatus;
instructions to search for a plurality of image forming apparatuses via the application and display a result of the searching;
instructions to receive an input of selecting, from among the plurality of image forming apparatuses, a first image forming apparatus that provides a first color profile for use in determining a color output via a first image forming operation, and a second image forming apparatus that is to update a color profile by using the first color profile;
instructions to obtain the first color profile according to the input and determine whether the first image forming apparatus and the second image forming apparatus are a same model, based on the first color profile; and
instructions to generate a second color profile that the second image forming apparatus uses to output the same or a similar color to the color output by the first image forming apparatus, based on a result of the determination and the first color profile,
wherein the instructions to generate the second color profile, based on the result of the determination and the first color profile, comprise instructions to generate the second color profile corresponding to the first color profile, based on information of a value of a parameter corrected to generate a first color lookup table (LUT) within the first color profile in the first image forming apparatus and a default color LUT of the image forming apparatus when the second image forming apparatus and the first image forming apparatus are different models.

10. The non-transitory computer-readable recording medium of claim 9, wherein the instructions executable by a processor comprise instructions to transmit the second color profile to the second image forming apparatus.

11. An image forming apparatus comprising:
a communication device to communicate with an external apparatus;
a processor;
a memory to store instructions executable by the processor; and
a user interface (UI) device to receive a user input and display information related to the image forming apparatus,
wherein the processor executes the instructions to:
search for a plurality of image forming apparatuses connected to the image forming apparatus and display a result of the searching on the UI device;
receive an input of selecting a first image forming apparatus from among the plurality of image forming apparatuses via the UI device;
display, on the UI device, at least one color profile stored in the first image forming apparatus and information related to the at least one color profile;
receive an input of selecting a first color profile, which is to be used by the image forming apparatus during an image forming operation, from the at least one color profile, via the UI device;
receive, from the first image forming apparatus via the communication device, the first color profile that the first image forming apparatus uses to determine a color output via a first image forming operation;
determine whether the first image forming apparatus and the image forming apparatus are a same model based on the first color profile; and
generate a second color profile that the image forming apparatus uses to output the same or a similar color to the color output via the first image forming operation based on a result of the determination and the first color profile.

12. The image forming apparatus of claim 11, wherein the processor executes the instructions to, when the first image forming apparatus and the image forming apparatus are different models, generate the second color profile corresponding to the first color profile by correcting a default color profile of the image forming apparatus based on data corrected from a default color profile of the first image forming apparatus to the first color profile.

13. The image forming apparatus of claim 11, wherein the processor executes the instructions to, when the first image forming apparatus and the image forming apparatus are different models, generate the second color profile corresponding to the first color profile based on information of a value of a parameter corrected to generate a first color lookup table (LUT) within the first color profile in the first image forming apparatus and a default color LUT of the image forming apparatus.

14. The image forming apparatus of claim 13, wherein the processor executes the instructions to:
   correct a value of a parameter within the default color LUT of the image forming apparatus, the parameter corresponding to the corrected parameter within the first color LUT based on the value of the corrected parameter within the first color LUT; and
   generate a second color LUT corresponding to the first color LUT based on information of the value of the corrected parameter within the default color LUT of the image forming apparatus.

15. The image forming apparatus of claim 13, wherein the first color profile comprises model information of the first image forming apparatus, information of the first color LUT of the first image forming apparatus, and information of parameters that constitute the first color LUT, and
   wherein the parameters comprise at least one of a contrast, a brightness, or a color balance that are used to correct a color based on an image forming operation.

16. The image forming apparatus of claim 11, wherein the processor executes the instructions to, when the image forming apparatus is the same model as the first image forming apparatus, store the first color profile as a color profile usable by the image forming apparatus in the memory.

17. The image forming apparatus of claim 11, wherein the processor executes the instructions to:
   display, on the UI device, a screen image for setting a color profile that is to be used by the image forming apparatus during an image forming operation;
   receive, via the UI device, an input of adjusting a value of a parameter that is used to correct a color difference during the image forming operation; and
   generate a customized color profile based on the input.

18. The image forming apparatus of claim 17, wherein the processor executes the instructions to display a list of the parameters on the screen image, and, in response to an input of selecting a first parameter from the list, display a UI for adjusting a value of the first parameter.

19. The image forming apparatus of claim 17, wherein the processor executes the instructions to transmit the customized color profile to an external image forming apparatus via the communication device based on information indicating that a user who has set the customized color profile has logged in to the external image forming apparatus or information of the external image forming apparatus that has performed a similar image forming operation to an image forming operation performed by the image forming apparatus.

\* \* \* \* \*